VACUUM TRANSFER ARM FOR CONTACT PRINTERS

Filed Oct. 6, 1955

Edgar R. Gobeille
Marcel Verdooner
INVENTORS

BY Clarence A. O'Brien
and Harvey B. Jacobson
Attorneys

United States Patent Office 2,842,037

Patented July 8, 1958

2,842,037

VACUUM TRANSFER ARM FOR CONTACT PRINTERS

Edgar R. Gobeille, Mountain Lakes, N. J., and Marcel Verdooner, New York, N. Y.

Application October 6, 1955, Serial No. 538,915

3 Claims. (Cl. 95—76)

This invention generally relates to an improved and novel vacuum transfer arm for use in the photographic processing field wherein a film or plate may be attached to the vacuum transfer arm and lowered over the sensitive material wherein the film or plate is then brought into intimate contact with the sensitive material during exposure thereof.

An object of the present invention is to provide a vacuum transfer arm employing means for properly aligning the arm supporting the film or plate with the sensitized material wherein the same relationship will be provided between the film and sensitized material.

Another object of the present invention is to provide a vacuum transfer arm employing solenoids for moving the vacuum transfer arm towards the table holding the sensitized material wherein plates supported on the vacuum transfer arm will be brought into intimate contact with the sensitive material.

Another important object of the present invention is to provide a vacuum transfer arm having vacuum means for holding film which may be as a positive or negative thereon for positioning over sensitive material wherein the vacuum which holds the film in position will be automatically released and vacuum for pulling the film downwardly onto the sensitive material will be automatically increased thereby properly positioning the film in relation to the sensitive material for exposure thereof.

Further important objects of the present invention will reside in its simplicity of construction, ease of manipulation, adaptation for various purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3, 4:
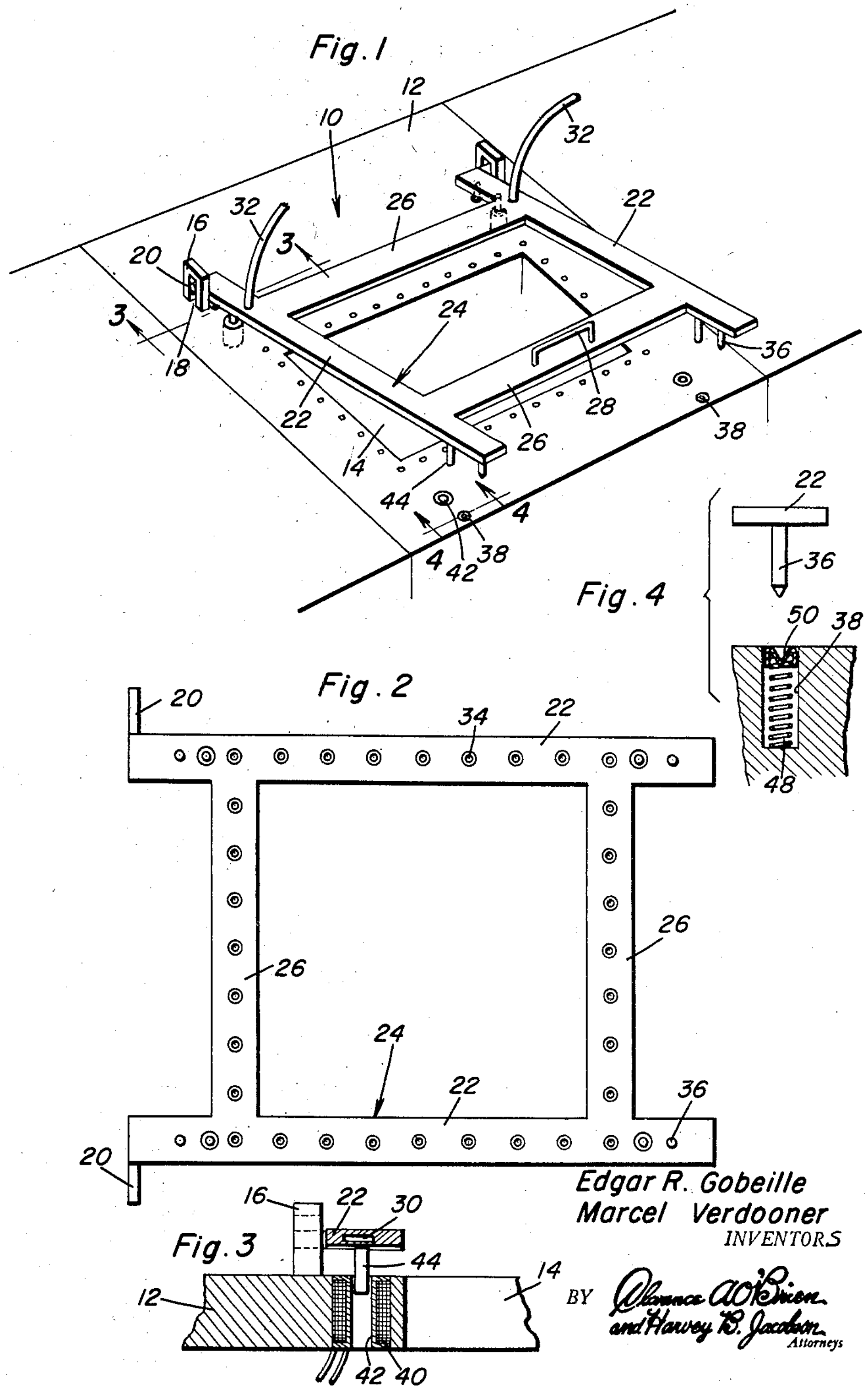
Figure 1 is a perspective view of the vacuum transfer arm of the present invention.
Figure 2 is a bottom plan view of the transfer arm of the present invention illustrating the position of the vacuum openings, solenoid pins and positioning pins.
Figure 3 is a detailed sectional view taken substantially upon a plane passing along section line 3—3 of Figure 1 illustrating the details of construction of the solenoid and the associated pin together with the vacuum channel in the transfer arm; and, Figure 4 is a detailed sectional view taken along section line 4—4 of Figure 1.

Referring now specifically to the drawings, the numeral 10 generally designates the vacuum transfer arm of the present invention which is adapted to be mounted on a table top 12 having an area 14 for positioning sensitive material of any desired and conventional type. The table top 12 is provided with a pair of aligned inverted lugs 16 which are generally U-shaped and provided with an inner slot 18 for slidably receiving outwardly projecting pins 20 on the ends of the side members 22 of the transfer arm designated generally by the numeral 24. Interconnecting members 26 are disposed between the side members 22 and the interconnecting member 26 remote from the hinge lug 16 is provided with an operating handle 28 for raising and lowering the arm 24 about the hinge pins 20. The side members 22 and the interconnecting members 26 are hollow and provided with an internal passageway 30 which is in communication with a vacuum hose 32 and the undersurface of the side members 22 and the transverse interconnecting members 26 are provided with openings 34 in the undersurface thereof for communication with the vacuum channel or passageway 30. The openings 34 may be fitted with rubber gaskets or the like for holding film on the arm 24.

Adjacent each corner of the arm 24 is a depending pin 36 with the front pins having conical lower ends and the rear pins being dome pins, each of which is adapted to engage in a socket 38 in the table top 12 wherein the transfer arm 24 will be accurately positioned in relation to the table top 12 whenever the arm 24 is brought to a position adjacent thereto.

Built into the table top 12 is a plurality of solenoids 40 adjacent each corner of the transfer arm 24 wherein the solenoid 40 is provided with a vertical bore 42 for receiving a depending pin 44 which forms a core for the solenoid 40 wherein the pin 44 is secured to the transfer arm 24 for urging the transfer arm 24 towards the table top 12 when the solenoid or electromagnet 40 is energized.

The surface 12 is also provided with vacuum apertures and the sockets 38 are provided with springs 48 supporting a conical seat 50 for receiving the lower end of equalizing and locating pins 36.

In using the vacuum transfer arm of the present invention in conjunction with film of either the positive or negative type, the film is attached to the arm in the exact printing position wherein the vacuum in the arm 24 is on and retains the film in position. To transfer the film to the table, the arm is lowered over the sensitive material and vacuum in the channel of the table is turned on automatically and also the vacuum in the arm is released automatically wherein the film will always be in the proper position since one vacuum is not released until the other vacuum has taken hold. The solenoids prevent any movement in the arm during the vacuum transfer operation. With the use of plates, the solenoid provides equal pressure on all areas of the plates thereby assuring even contact of all areas of the plates with the sensitive material and the equalizer pins assure accurate return of the arm for any number of subsequent exposures.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vacuum transfer arm for use with a table surface having an area for holding sensitive material, said arm comprising a pair of rigid side members and a pair of rigid interconnecting members, said members being hollow and communicated with a vacuum source, the undersurface of said members having a plurality of openings communicating with the interior thereof for retaining a film thereon, the table surface having a plurality of sockets with movable pin receptacles therein, said members having depending pins for engagement with the pin receptacles thereby locating and equalizing the arm in relation to the table surface, and means for urging the arm towards the table surface thereby preventing relative movement between the arm and table surface.

2. A vacuum transfer arm for use with a table surface having an area for holding sensitive material, said arm comprising a pair of rigid side members and a pair of rigid interconnecting members, said members being hollow and communicated with a vacuum source, the undersurface of said members having a plurality of openings communicating with the interior thereof for retaining a film thereon, the table surface having a plurality of sockets with movable pin receptacles therein, said members having depending pins for engagement with the pin receptacles thereby locating and equalizing the arm in relation to the table surface, and means for urging the arm towards the table surface thereby preventing relative movement between the arm and table surface, said means including a plurality of solenoids disposed in the table surface with vertical bores therein, a plurality of depending pins on said arm for disposition in said bores and forming a movable core for the solenoids.

3. The combination of claim 2 the table surface having a plurality of openings encircling the sensitive material area in communication with a vacuum source whereby film may be transferred to the table surface by applying vacuum to the opening in the table surface and subsequently releasing the vacuum in said members.

References Cited in the file of this patent

UNITED STATES PATENTS

| | | |
|---|---|---|
| 1,722,228 | Maresh | July 23, 1929 |
| 1,822,489 | Kanolt | Sept. 8, 1931 |
| 2,296,152 | Downing | Sept. 15, 1942 |

FOREIGN PATENTS

| | | |
|---|---|---|
| 648,332 | Germany | July 28, 1937 |